United States Patent
Jang et al.

(10) Patent No.: US 9,778,962 B2
(45) Date of Patent: Oct. 3, 2017

(54) METHOD FOR MINIMIZING LOCK CONTENTION AMONG THREADS WHEN TASKS ARE DISTRIBUTED IN MULTITHREADED SYSTEM AND APPARATUS USING THE SAME

(71) Applicant: TMAXSOFT. CO., LTD., Gyeonggi-do (KR)

(72) Inventors: Young Hwi Jang, Seoul (KR); Eui Geun Chung, Gyeonggi-do (KR)

(73) Assignee: TMAXSOFT. CO., LTD., Gyeonggi-do (KR)

(*) Notice: Subject to any disclaimer, the term of this patent is extended or adjusted under 35 U.S.C. 154(b) by 0 days.

(21) Appl. No.: 14/927,452

(22) Filed: Oct. 29, 2015

(65) Prior Publication Data

US 2016/0335135 A1 Nov. 17, 2016

(30) Foreign Application Priority Data

May 14, 2015 (KR) .................. 10-2015-0067666

(51) Int. Cl.
*G06F 9/46* (2006.01)
*G06F 9/52* (2006.01)

(52) U.S. Cl.
CPC .................. *G06F 9/524* (2013.01)

(58) Field of Classification Search
None
See application file for complete search history.

(56) References Cited

U.S. PATENT DOCUMENTS

| | | | | |
|---|---|---|---|---|
| 7,565,651 | B1 * | 7/2009 | Carey | G06F 9/4881 718/100 |
| 8,037,474 | B2 * | 10/2011 | Bates | G06F 9/4881 712/220 |
| 8,413,161 | B2 * | 4/2013 | Blackburn | G06F 9/4881 710/54 |
| 2007/0143761 | A1 * | 6/2007 | Deng | G06F 9/4881 718/103 |

FOREIGN PATENT DOCUMENTS

| | | |
|---|---|---|
| KR | 1020010048804 A | 6/2001 |
| KR | 1020070075725 A | 7/2007 |
| KR | 1020100060312 A | 6/2010 |
| KR | 1020120042619 A | 5/2012 |

* cited by examiner

*Primary Examiner* — Gregory A Kessler
(74) *Attorney, Agent, or Firm* — Husch Blackwell LLP

(57) ABSTRACT

A method for minimizing lock contention among threads in a multithreaded system is disclosed. The method includes the steps of: (a) a processor causing a control thread, if information on a task is acquired by the control thread, to acquire a lock to thereby put the information on a task into a specific task queue which satisfies a certain condition among multiple task queues; and (b) the processor causing a specified worker thread corresponding to the specific task queue among multiple worker threads, if the lock held by the control thread is released, to acquire a lock to thereby get a task stored in the specific task queue.

4 Claims, 3 Drawing Sheets

METHOD FOR MINIMIZING LOCK CONTENTION AMONG THREADS WHEN TASKS ARE DISTRIBUTED IN MULTITHREADED SYSTEM AND APPARATUS USING THE SAME

CROSS REFERENCE TO RELATED APPLICATION

This application claims priority to and incorporates herein by reference all disclosure in Korean Patent Application No. 10-2015-0067666 filed May 14, 2015.

FIELD OF THE INVENTION

The present invention relates to a method for minimizing lock contention among threads when tasks are distributed in a multithreaded system and an apparatus with the multithreaded system; and more particularly, to the method for (a) a control thread, if acquiring a new task, acquiring a lock to thereby put the new task into a specific task queue which satisfies a certain condition among multiple task queues; and (b) a specified worker thread corresponding to the specific task queue among multiple worker threads, if the lock held by the control thread is released, acquiring a lock to thereby get a task stored in the specific task queue, in a multithreaded system.

BACKGROUND OF THE INVENTION

In computer science, a thread of execution is the smallest sequence of programmed instructions that can be managed independently by a scheduler, which is typically a part of the operating system. In most cases, a thread is a component of a process. Information on a thread has a thread ID, a program counter, a register set, and a stack to handle the service request and shares other resources such as codes, data, and files with other threads. Depending on program environment, two or more threads may be executed simultaneously and such execution method is called multithreading. Multiple threads can exist within the same process and share resources such as memory, while different processes do not share these resources.

In a multithreaded system, there is a task queue to distribute at least one task to one of multiple work threads, which contend with one another for the task. At the time, as two or more worker threads cannot access the task queue at the same time, the respective worker threads should acquire a lock to prevent other worker threads from accessing the task queue and get the task from the task queue. However, in the multithreaded system, when the number of worker threads increases, the lock contention among the multiple worker threads becomes fierce and the performance of the whole system is degraded.

FIG. 1 is a drawing illustrating a multithreaded system for assigning a task to one of the multiple worker threads through one task queue according to the prior art.

By referring to FIG. 1, the multithreaded system 100 according to the prior art includes a control thread 20, one task queue 30, and multiple worker threads 40-1, 40-2, . . . , and 40-n.

A processor (non-illustrated) may cause the control thread 20 to receive a new task 14 and put it into the task queue 30, where tasks 11, 12, and 13 may be waiting. The processor may cause the task queue 30 to distribute the waiting tasks 11, 12, and 13 in prescribed order (e.g., FIFO) to the multiple worker threads 40-1, 40-2, . . . , and 40-n. At the time, the multiple worker threads 40-1, 40-2, . . . , and 40-n should contend with one another to get the tasks from the task queue 30 in the multithreaded system 100. At the time, as two or more threads cannot access the task queue 30 at the same time, the control thread 20 and the respective worker threads 40-1, 40-2, . . . , and 40-n must acquire a lock to prevent other threads from accessing the task queue 30 and put the new task 14 into the task queue 30 or get tasks 11, 12, and 13 from the task queue 30. In particular, the respective worker threads 40-1, 40-2, . . . , and 40-n should contend not only with the control thread 20 but also with other worker threads to preoccupy the task queue 30. Thus, if the number of worker threads 40-1, 40-2, . . . , and 40-n increases, the performance of the whole system may be degraded.

Accordingly, a new technology is required to minimize the lock contention among worker threads even though the number of worker threads increases in the multithreaded system.

SUMMARY OF THE INVENTION

It is an object of the present invention to solve all the aforementioned problems.

It is another object of the present invention to produce optimal performance in a multithreaded system by minimizing the lock contention among worker threads even though the number of worker threads increases in the multithreaded system.

It is still another object of the present invention to minimize the lock contention by placing multiple task queues, each of which corresponds to each of the worker threads in the multithreaded system.

It is still yet another object of the present invention to minimize the lock contention among multiple worker threads by placing multiple integrated task queues, each of which corresponds to multiple worker threads in the multithreaded system.

In accordance with one aspect of the present invention, there is provided a method for minimizing lock contention among threads in a multithreaded system, including the steps of: (a) a processor causing a control thread, if information on a task is acquired by the control thread, to acquire a lock to thereby put the information on a task into a specific task queue which satisfies a certain condition among multiple task queues; and (b) the processor causing a specified worker thread corresponding to the specific task queue among multiple worker threads, if the lock held by the control thread is released, to acquire a lock to thereby get a task stored in the specific task queue.

In accordance with another aspect of the present invention, there is provided a method for minimizing lock contention among threads in a multithreaded system, including the steps of: (a) a processor causing a control thread, if information on a task is acquired by the control thread, to acquire a lock to thereby put the information on a task into a specific task queue which satisfies a certain condition among multiple task queues; and (b) the processor causing one or more specified worker threads corresponding to the specific task queue among multiple worker threads, if the lock held by the control thread is released, to contend for a lock and then causing one of the specified worker threads to acquire the lock to thereby get a task stored in the specific task queue.

In accordance with still another aspect of the present invention, there is provided an apparatus for minimizing lock contention among threads in a multithreaded system, including: a memory; and a processor for (i) causing a control thread, if information on a task is acquired by the control thread, to acquire a lock and then to thereby put the information on a task into a specific task queue which satisfies a certain condition among multiple task queues and (ii) causing a specified worker thread corresponding to the specific task queue among multiple worker threads, if the lock held by the control thread is released, to acquire a lock to thereby get a task stored in the specific task queue.

In accordance with still yet another aspect of the present invention, there is provided an apparatus for minimizing lock contention among threads in a multithreaded system, including: a memory; and a processor for (i) causing a control thread, if information on a task is acquired by the control thread, to acquire a lock to thereby put the information on a task into a specific task queue which satisfies a certain condition among multiple task queues; and (ii) causing one or more specified worker threads corresponding to the specific task queue among multiple worker threads, if the lock held by the control thread is released, to contend for a lock and then causing one of the specified worker threads to acquire the lock to thereby get a task stored in the specific task queue.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
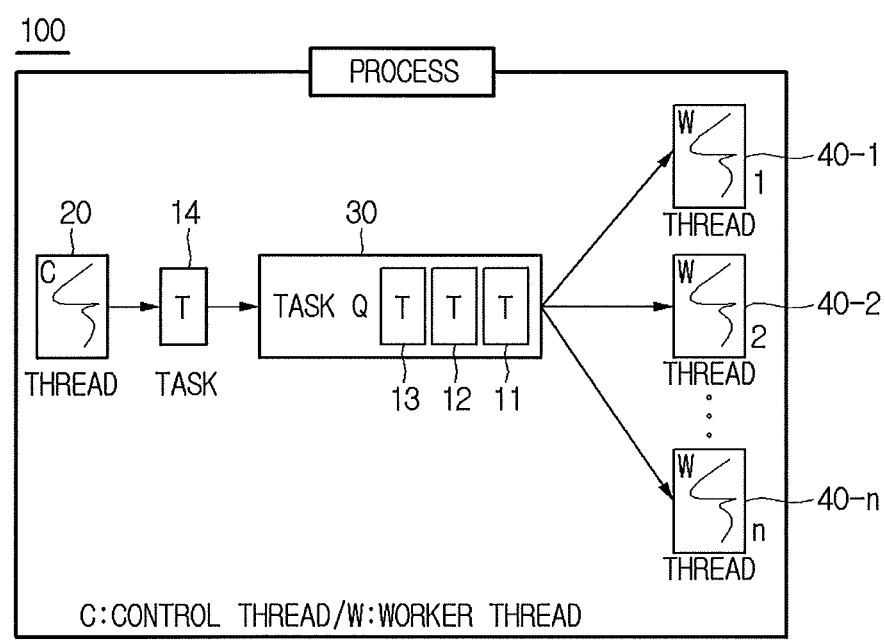
FIG. 1 is a drawing illustrating a multithreaded system for assigning tasks to multiple worker threads through one task queue according to the prior art.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of respective elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
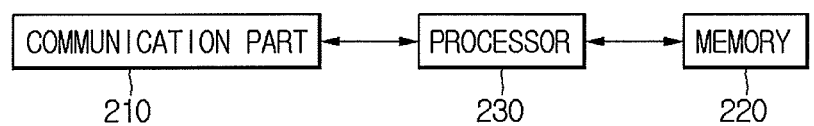
FIG. 2 is a block diagram illustrating a configuration of an apparatus with a multithreaded system in accordance with one example embodiment of the present invention.

To allow those skilled in the art to the present invention to be carried out easily, the example embodiments of the present invention by referring to attached diagrams will be explained in detail as follows:

FIG. 2 is a block diagram illustrating a configuration of an apparatus with a multithreaded system in accordance with one example embodiment of the present invention.

By referring to FIG. 2, an apparatus 200 with a multithreaded system in accordance with one example embodiment of the present invention includes a communication part 210, a memory 220, and a processor 230.

Herein, the apparatus 200 in accordance with one example embodiment of the present invention is a digital device and any digital devices, including a desktop computer, a laptop computer, a workstation, etc., which have memory means and processors with a calculation ability, may be adopted as a server in accordance with one example embodiment of the present invention. Notably, the apparatus 200 with the multithreaded system may be implemented as a web server which provides a service in response to a request of a client terminal.

The communication part 210 may get a request for a task. For example, if there is an HTTP request from a client, the communication part 210 may get such a request for a task. A task acquired by the request may be delivered to a control thread in a process of an operating system.

The memory 220 may store various kinds of data. A task queue to be explained later may be on the memory 220 and include a pointer for task data. Furthermore, data on a control thread and a worker thread may be stored in the memory 220. For example, the memory 220 may store a thread ID, a program counter, a register set, a stack, etc. of each worker thread.

Further, the processor 230 controls overall operation of the apparatus 200 with the multithreaded system, which has multiple task queues per process. The processor 230 may cause its control thread to put a task into a specific task queue which satisfies a certain condition among multiple task queues. The processor 230 may cause the control thread to acquire a lock and put the task into the specific task queue which satisfies the certain condition among the multiple task queues. Besides, if the lock on the specific task queue is released, the processor 230 may cause a worker thread to acquire a lock again for the specific task queue and receive a task from the specific task queue. The processor 230 causes the worker thread where the task is assigned to perform the task. As such, the present invention may reduce the lock contention among multiple worker threads by including the multiple task queues per process and putting a task into the specific task queue, which satisfies the certain condition among the multiple task queues.

Meanwhile, if the apparatus 200 with the multithreaded system is implemented as a web server, the processor 230 may be included in a handler processor for handling at least one service request corresponding to at least one file descriptor on the basis of network connection between the apparatus 200 and at least one client. In this case, the handler processor may cause the control thread to receive the HTTP service request and put it into the specific task queue and cause the worker thread corresponding to the specific task to receive the HTTP service request from the specific task queue and handle it.

A variety of example embodiments of the present invention will be explained in details below.

Figure 3:
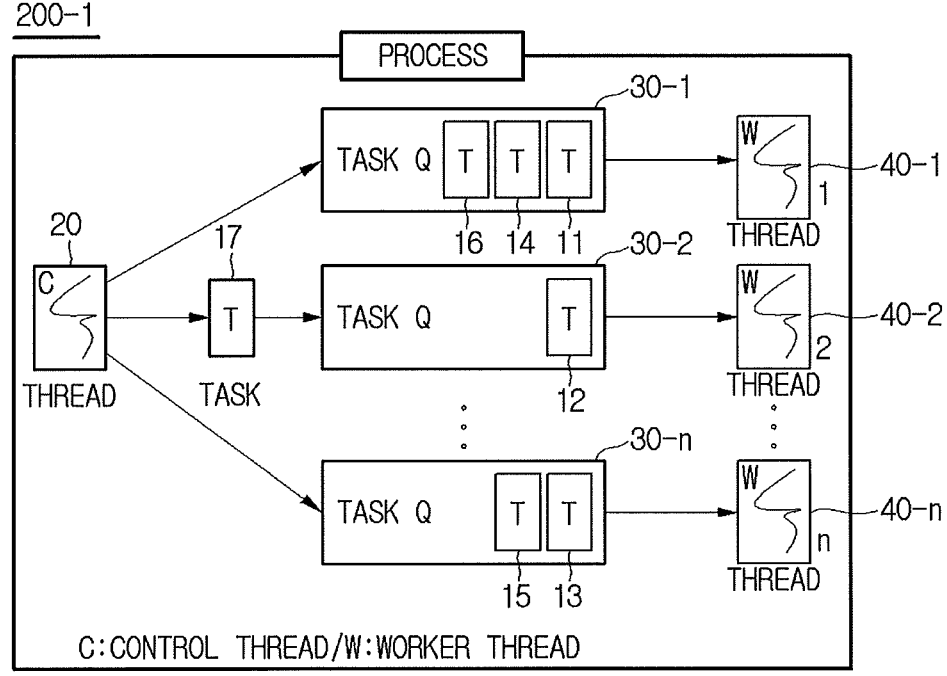
FIG. 3 is a drawing showing the multithreaded system in accordance with one example embodiment of the present invention.

FIG. 3 is a drawing showing the multithreaded system in accordance with one example embodiment of the present invention.

By referring to FIG. 3, a multithreaded system 200-1 in accordance with one example embodiment of the present invention may include a control thread 20 for receiving tasks, multiple task queues 30-1, 30-2, . . . , and 30-n for receiving task-related information from the control thread 20 and storing it, and respective worker threads 40-1, 40-2, . . . , and 40-n corresponding to the respective task queues 30-1, 30-2, . . . , and 30-n. To put it another way, the multithreaded system 200-1 has one-to-one relationships between the respective task queues 30-1, 30-2, . . . , and 30-n and the respective worker threads 40-1, 40-2, . . . , and 40-n. In other words, each of the worker threads 40-1, 40-2, . . . , and 40-n may get tasks from each corresponding task queue among the task queues 30-1, 30-2, . . . , and 30-n. The task-related information received from the control thread 20 by the respective task queues 30-1, 30-2, . . . , and 30-n may include information on a pointer for pointing task data. The respective worker threads 40-1, 40-2, . . . , and 40-n perform tasks received from their corresponding task queues.

At the time, if the control thread 20 gets a new task 17, the processor 230 may cause the control thread 20 to acquire a lock and then put a task 17 into a specific task queue which satisfies a certain condition among the multiple task queues 30-1, 30-2, . . . , and 30-n.

Herein, whether the certain condition is satisfied or not may be checked by referring to information on the number of waiting tasks within the respective task queues 30-1, 30-2, . . . , and 30-n. For example, if the control thread 20 gets the new task 17, the processor 230 may cause the control thread 20 to acquire a lock to put the task 17 into a specific task queue which has the least number of waiting tasks therein among the multiple task queues 30-1, 30-2, . . . , and 30-n. In FIG. 3, the new task 17 could be put into the task queue 30-2 which has the least number of waiting tasks.

As another example, whether the certain condition is satisfied or not may be checked by referring to information on relative order allotted to the respective task queues 30-1, 30-2, . . . , and 30-n. For instance, if the control thread 20 gets the new task 17, the processor 230 may cause the control thread 20 to acquire a lock to put the new task 17 into the specific task queue selected by referring to the allotted relative order among the task queues 30-1, 30-2, . . . , and 30-n. In FIG. 3, if the highest priority is allotted to a task queue 30-1 as default, the new task 17 could be put into the task queue 30-1.

However, even though the specific task queue is determined by referring to information on relative order allotted to the respective task queues 30-1, 30-2, . . . , and 30-n, the processor 230 may also determine the specific task queue by further referring to information on the number of waiting tasks within the multiple task queues 30-1, 30-2, . . . , and 30-n at a fixed time interval. For example, the processor 230 may put the task 17 into a specific task queue selected among the task queues 30-1, 30-2, . . . , and 30-n by referring to information on relative order allotted to the respective task queues 30-1, 30-2, . . . , and 30-n as default and, at an interval of 10 seconds, the processor 230 may select the specific task queue by referring to information on the number of waiting tasks within the respective task queues 30-1, 30-2, . . . , and 30-n. This may prevent workload from being concentrated on some task queues.

As still another example, after selecting a specific task queue by referring to information on relative order allotted to the respective task queues 30-1, 30-2, . . . , and 30-n at predetermined number of times, the processor 230 may also select the specific task queue by referring to information on the number of waiting tasks within the respective task queues 30-1, 30-2, . . . , and 30-n.

Besides, whether the certain condition is satisfied or not may be checked by referring to information on order randomly allotted to the respective task queues 30-1, 30-2, . . . , and 30-n. For example, if the control thread 20 gets the new task 17, the processor 230 may also cause the control thread 20 to acquire a lock on the specific task queue in random order and put the task 17 into the specific task queue.

If the lock on the specific task queue is released, the processor 230 may cause a specified worker thread corresponding to the specific task queue among the multiple worker threads 40-1, 40-2, . . . , and 40-n to acquire a lock again on the specific task queue and then get a task stored in the specific task queue. In this way, the present invention may improve system performance compared to the multithreaded system 100 in FIG. 1 because only the specified worker thread and the control thread 20 contend for the lock.

Meanwhile, at least some of the lock acquired by the control thread 20 and the lock acquired by the worker thread, as explained above, may be a spinlock. The spinlock means a lock which causes a thread trying to acquire it to simply wait in a loop, i.e., spin, while repeatedly checking if the lock is available. Once acquired, spinlocks will usually be held until they are explicitly released, although in some implementations they may be automatically released if the thread being waited on blocks, or "goes to sleep". Because they avoid overhead from operating system process rescheduling or context switching, spinlocks are efficient if threads are likely to be blocked for only short periods. For this reason, operating-system kernels often use spinlocks. In accordance with one example embodiment of the present invention, as only the control thread 20 and the specified worker thread corresponding to the specific task queue contend for a lock, a thread failing to acquire a lock in use of a spinlock may be allowed to acquire the lock within a short time while waiting in a loop for a while. However, the present invention does not exclude other locking methods such as mutex.

The aforementioned example embodiment may also be performed by multiple processors. In short, the apparatus 200 with the multithreaded system may include the multiple processors. To put a task into a specific task queue which satisfies a certain condition among the multiple task queues 30-1, 30-2, . . . , and 30-n, a first processor (non-illustrated) may cause the control thread 20 to acquire a lock and put the task 17 into the specific task queue and then if the lock held by the control thread 20 is released, a second processor (non-illustrated) different from the first one may also cause the specified worker thread corresponding to the specific task queue among the multiple worker threads to acquire the lock again for the specific task queue and get a task stored in the specific task queue.

Moreover, it is made clear that the processor 230 as explained above may be stated as one processor but it could be multiple processors. In addition, a core included in each processor could be a multi-core or a single core.

Furthermore, if the processor 230 as explained above includes a multi-core, the aforementioned example embodiment could be also performed by the multiple cores. In other words, to put a task into a specific task queue which satisfies a certain condition among the multiple task queues 30-1, 30-2, . . . , and 30-n, a first core (non-illustrated) may cause the control thread 20 to acquire a lock and put the task 17 into the specific task queue and then if the lock held by the control thread 20 is released, a second core (non-illustrated) different from the first one may also cause the specified worker thread corresponding to the specific task queue among the multiple worker threads to acquire the lock again for the specific task queue and get a task stored in the specific task queue.

Figure 4:
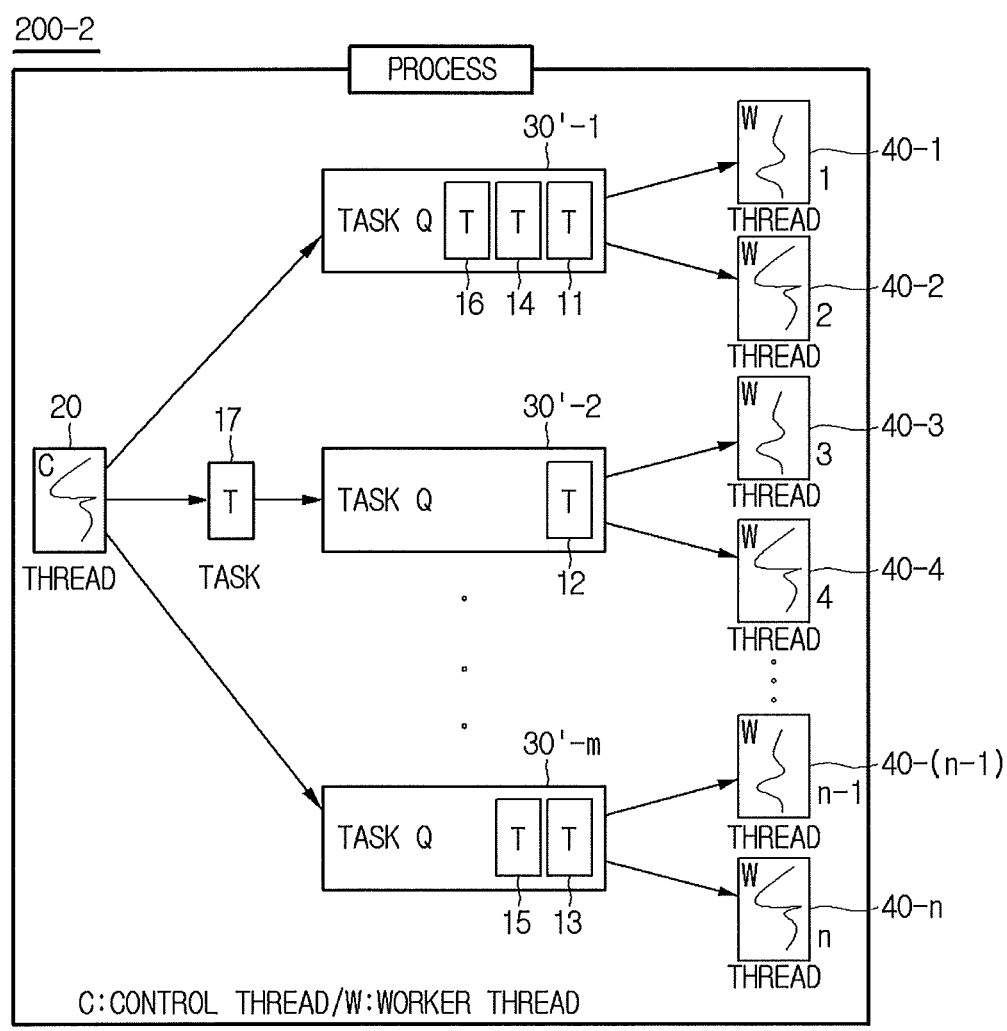
FIG. 4 is a drawing showing the multithreaded system in accordance with another example embodiment of the present invention.

FIG. 4 is a drawing showing a multithreaded system in accordance with another example embodiment of the present invention.

By referring to FIG. 4, a multithreaded system 200-2 in accordance with another example embodiment of the present invention may include a control thread 20 for receiving tasks, multiple task queues 30'-1, 30'-2, . . . , and 30'-m for receiving and storing tasks-related information from the control thread 20, and multiple worker threads 40-1, 40-2, . . . , and 40-n. In short, the multiple worker threads 40-1, 40-2, . . . , and 40-n are divided into m groups. Herein, the m groups, each of which includes one or more worker threads selected among the multiple worker threads 40-1, 40-2, . . . , and 40-n, may correspond to each of the task queues 30'-1, 30'-2, . . . , and 30'-m. That is, the respective task queues 30'-1, 30'-2, . . . , and 30'-m may assign tasks to their corresponding worker threads. For example, as illustrated in FIG. 4, a task queue 30'-1 may correspond to the worker threads 40-1 and 40-2 and a task queue 30'-m may correspond to the worker threads 40-(n−1) and 40-n. The respective worker threads 40-1, 40-2, . . . , and 40-n perform the tasks taken over from their corresponding task queues. Herein, all the task queues 30'-1, 30'-2, . . . , and 30'-m are not necessary to correspond to multiple worker threads, but some of them could also correspond to only one worker thread.

At the time, if the control thread 20 gets a new task 17, the processor 230 may cause the control thread 20 to acquire a lock and put the task 17 into a specific task queue which satisfies a certain condition among the multiple task queues 30'-1, 30'-2, . . . , and 30'-m. Herein, the certain condition may include at least one of conditions about the number of waiting tasks within the respective task queues 30'-1, 30'-2, . . . , and 30'-m, relative order allotted to the respective task queues 30'-1, 30'-2, . . . , and 30'-m, and random order.

If the lock held by the control thread 20 for the specific task queue is released, the processor 230 may cause multiple specified worker threads corresponding to the specific task queue among all the worker threads 40-1, 40-2, . . . , and 40-n to contend for the lock and cause one of the multiple specified worker threads to acquire the lock again for the specific task queue and get a task stored in the specific task queue. The multithreaded system 200-2 may achieve the system effectiveness in that it can reduce the lock contention among worker threads compared to the prior art of FIG. 1 and save the space of memory in which task queues are recorded compared to FIG. 3.

Meanwhile, while the multiple specified worker threads corresponding to the specific task queue contend for the lock, at least some of information on relative order allotted to the multiple specified worker threads and information on a state of a task processed by the respective specified worker threads may be referred to. For example, if there are a first worker thread and a second one corresponding to the specific task queue, the first worker thread determined to be in higher order as a default may acquire the lock preferentially. As another example, the second worker thread whose task time ends faster could be also implemented to acquire the lock first.

The present invention has effects as shown below.

The present invention has an effect of being capable of producing optimal performance in a multithreaded system by minimizing the lock contention among worker threads even though the number of worker threads increases in the multithreaded system.

Moreover, the present invention has an effect of minimizing the lock contention by placing multiple task queues, each of which corresponds to each of the worker threads in the multithreaded system.

The present invention additionally has an effect of minimizing the lock contention by placing multiple task queues, each of which corresponds to multiple worker threads in the multithreaded system.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for minimizing lock contention among threads in a multithreaded system, comprising the steps of:
    (a) a processor causing a control thread, if information on a task is acquired by the control thread, to acquire a lock to thereby put the information on a task into a specific task queue which satisfies a certain condition among multiple task queues; and
    (b) upon release of the lock held by the control thread on the specific task queue, the processor causing a specified set of two or more specified worker threads that correspond solely to the specific task queue to contend for a lock on the specific task queue and then causing one of the specified worker threads to acquire the lock to thereby get a task stored in the specific task queue;
    wherein at least one of the locks acquired by the control thread and the locks acquired by the worker threads is a spinlock;
    wherein each of the multiple task queues corresponds to at least two worker threads among the multiple worker threads; and wherein the certain condition includes at least one of:
a specific task queue with a least number of waiting tasks therein when none of the multiple task queues are empty,
a specific task queue with a highest allotted priority, and
an allotted relative order of the multiple task queues.

2. The method of claim 1, wherein, at the step of (b), when the specified worker threads corresponding to the specific task queue contend for the lock, at least some of information on relative order allotted to the respective specified worker threads and information on status of tasks handled by the respective specified worker threads are referred to.

3. An apparatus for minimizing lock contention among threads in a multithreaded system, comprising:
a memory; and
a processor for
(i) causing a control thread, if information on a task is acquired by the control thread, to acquire a lock to thereby put the information on a task into a specific task queue which satisfies a certain condition among multiple task queues; and
(ii) upon release of the lock held by the control thread on the specific task queue, causing a specified set of two or more specified worker threads that correspond solely to the specific task queue to contend for a lock and then causing one of the specified worker threads to acquire the lock to thereby get a task stored in the specific task queue, wherein each of the multiple task queues corresponds to at least two worker threads among the multiple worker threads;
wherein at least one of the locks acquired by the control thread and the locks acquired by the worker threads is a spinlock; and
wherein the certain condition includes at least one of:
a specific task queue with a least number of waiting tasks therein when none of the multiple task queues are empty,
a specific task queue with a highest allotted priority, and
an allotted relative order of the multiple task queues.

4. The apparatus of claim 3, wherein, when the specified worker threads corresponding to the specific task queue contend for the lock, at least some of information on relative order allotted to the respective specified worker threads and information on status of tasks handled by the respective specified worker threads are referred to.

* * * * *